(12) United States Patent
Nakamura (10) Patent No.: US 8,018,667 B2
(45) Date of Patent: Sep. 13, 2011

(54) OPTICAL APPARATUS

(75) Inventor: Hidekazu Nakamura, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/544,732

(22) Filed: Aug. 20, 2009

(65) Prior Publication Data

US 2010/0046101 A1      Feb. 25, 2010

(30) Foreign Application Priority Data

Aug. 21, 2008   (JP) .................................. 2008-212312

(51) Int. Cl.
*G02B 7/02*       (2006.01)

(52) U.S. Cl. .......................... 359/824; 359/819; 359/822

(58) Field of Classification Search .......... 359/811–824, 359/826
See application file for complete search history.

(56) References Cited

U.S. PATENT DOCUMENTS

| | | | | |
|---|---|---|---|---|
| 5,146,071 | A * | 9/1992 | Ookubo et al. | 250/201.2 |
| 5,162,948 | A * | 11/1992 | Horning et al. | 359/694 |
| 6,879,445 | B2 * | 4/2005 | Hamasaki | 359/696 |
| 7,064,911 | B2 * | 6/2006 | Soppelsa | 359/823 |
| 2008/0181594 | A1 * | 7/2008 | Noguchi | 396/55 |
| 2008/0253003 | A1 * | 10/2008 | Shin et al. | 359/824 |
| 2008/0291540 | A1 * | 11/2008 | Nakamura et al. | 359/554 |

FOREIGN PATENT DOCUMENTS

JP           05-034556           2/1993

* cited by examiner

*Primary Examiner* — Mohammed Hasan
(74) *Attorney, Agent, or Firm* — Canon USA Inc IP Division (57) ABSTRACT

An optical apparatus includes a second member 6 supporting a first member 4 so as to be movable in an optical axis direction and biasing devices 401 and 406 having biasing force acting on the first member. Two first balls 403a and 403b are arranged at positions away from each other in the optical axis direction and a second ball 403c is arranged at a phase different from that of the first balls. The first and second members include guide sections 4a and 6a engaging with the first balls so as to permit a rolling motion of the first balls in the optical axis direction and prevent a displacement of the first member in a different direction and a rotation preventing section permitting a rolling motion of the second ball in the optical axis direction and preventing a rotation of the first member around the guide section.

16 Claims, 8 Drawing Sheets

OPTICAL APPARATUS

BACKGROUND OF THE INVENTION

1. Field of the Invention

The present invention relates to an optical apparatus such as a digital camera, a video camera, or an interchangeable lens, and more particularly to an optical apparatus having a mechanism that guides a lens holding member by a ball in an optical axis direction.

2. Description of the Related Art

As a guide mechanism which guides a lens holding member holding a lens so as to be movable in an optical axis direction, a mechanism in which a guide bar extending in the optical axis direction is used is often adopted. However, in a guide mechanism in which a guide bar is used, because there is necessarily a minor backlash between the lens holding member and the guide bar, a displacement is generated by the backlash in a plane orthogonal to the optical axis of the lens holding member (i.e. lens). Therefore, the optical performance of the optical apparatus is degraded.

As a countermeasure against reducing such a backlash between the lens holding frame and the guide bar, it is considered that a biasing mechanism having a biasing force for pressing the lens holding frame with respect to the guide bar is provided. However, when biasing force acts, the drive load of the lens holding frame increases in accordance with the increase of the frictional force between the lens holding frame and the guide bar.

Japanese Patent Laid-Open No. 05-034556 discloses a lens barrel in which a plurality of balls held by a retainer are arranged between a fixed barrel and a lens holding frame, and the ball performs a rolling motion in a V-shaped groove section provided on the lens holding frame in accordance with the movement of the lens holding frame with respect to the fixed barrel in an optical axis direction. In the lens barrel, a biasing mechanism where balls are arranged at three areas in a circumferential direction and one of the balls is pressed to the V-shaped groove section by a spring force and the other two balls are pressed to the fixed barrel by the lens holding frame receiving the pressing force is adopted. According to the configuration, a minor backlash of a lens holding frame with respect to the fixed barrel is eliminated and a small sliding friction is only generated between the lens holding frame and the fixed barrel by the rolling motion of the ball to suppress the increase of the drive load of the lens holding frame.

However, in the configuration disclosed in Japanese Patent Laid-Open No. 05-034556, the rotation of the lens holding frame with respect to the fixed barrel in a direction around an optical axis is prevented by engaging a pin provided on the lens holding frame with a key groove section formed on the fixed barrel. In other words, the guide of the lens holding frame with respect to the fixed barrel in an optical axis direction is performed by the engagement of the pin and the key groove section. A sliding friction greater than a rolling friction is generated between the pin and the key groove section. Therefore, the drive load of the lens holding frame increases.

BRIEF SUMMARY OF THE INVENTION

The present invention provides an optical apparatus in which a backlash of a lens holding member is eliminated and a generation load caused by the movement of the lens holding member is reduced.

An optical apparatus as one aspect of the present invention includes a first member which holds a lens, a second member which supports the first member so as to be movable in an optical axis direction via a plurality of balls, and a biasing device which has a biasing force acting on the first member for pressing the plurality of balls with respect to the second member. The plurality of balls include two first balls which are arranged at positions away from each other in the optical axis direction and a second ball arranged at a phase different from that of the first balls in a direction around the optical axis. The first and second members includes a guide section which is configured to engage with the first balls so as to permit a rolling motion of the first balls in the optical axis direction and prevent a displacement of the first member with respect to the second member in a direction different from the optical axis direction and a rotation preventing section which is configured to permit a rolling motion of the second ball in the optical axis direction and prevent a rotation of the first member with respect to the second member around the guide section.

Further features and aspects of the present invention will become apparent from the following description of exemplary embodiments with reference to the attached drawings.

DETAILED DESCRIPTION OF THE PREFERRED EMBODIMENTS

Exemplary embodiments of the present invention will be described below with reference to the accompanied drawings.

Figure 1:
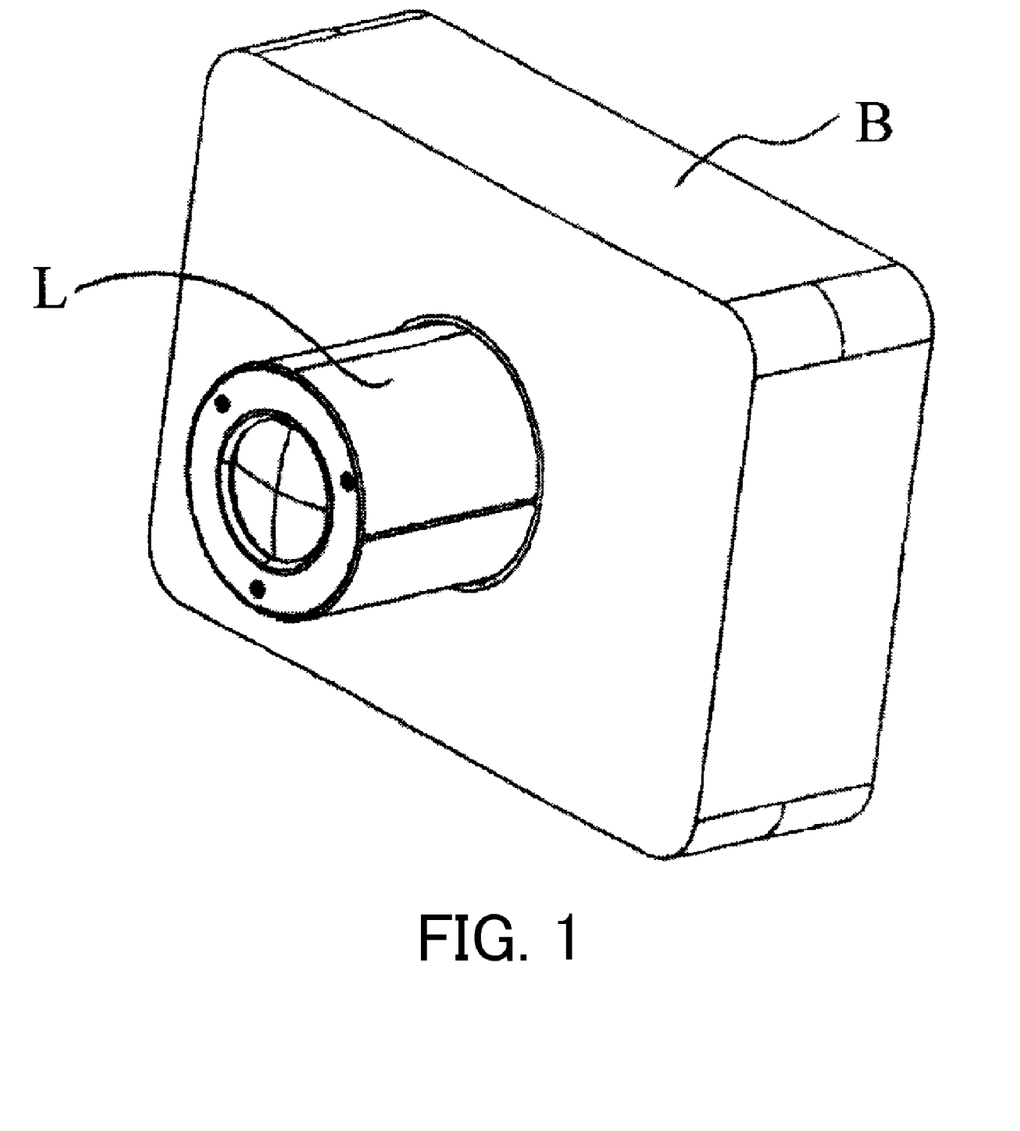
FIG. 1 is a perspective view of a camera that is an embodiment of the present invention.

FIG. 1 shows an appearance of an image pickup apparatus (optical apparatus: hereinafter, referred to as a camera) such as a video camera or a digital camera that is an embodiment of the present invention. Reference symbol B denotes a camera body, and reference symbol L denotes a lens barrel.

Figure 2:
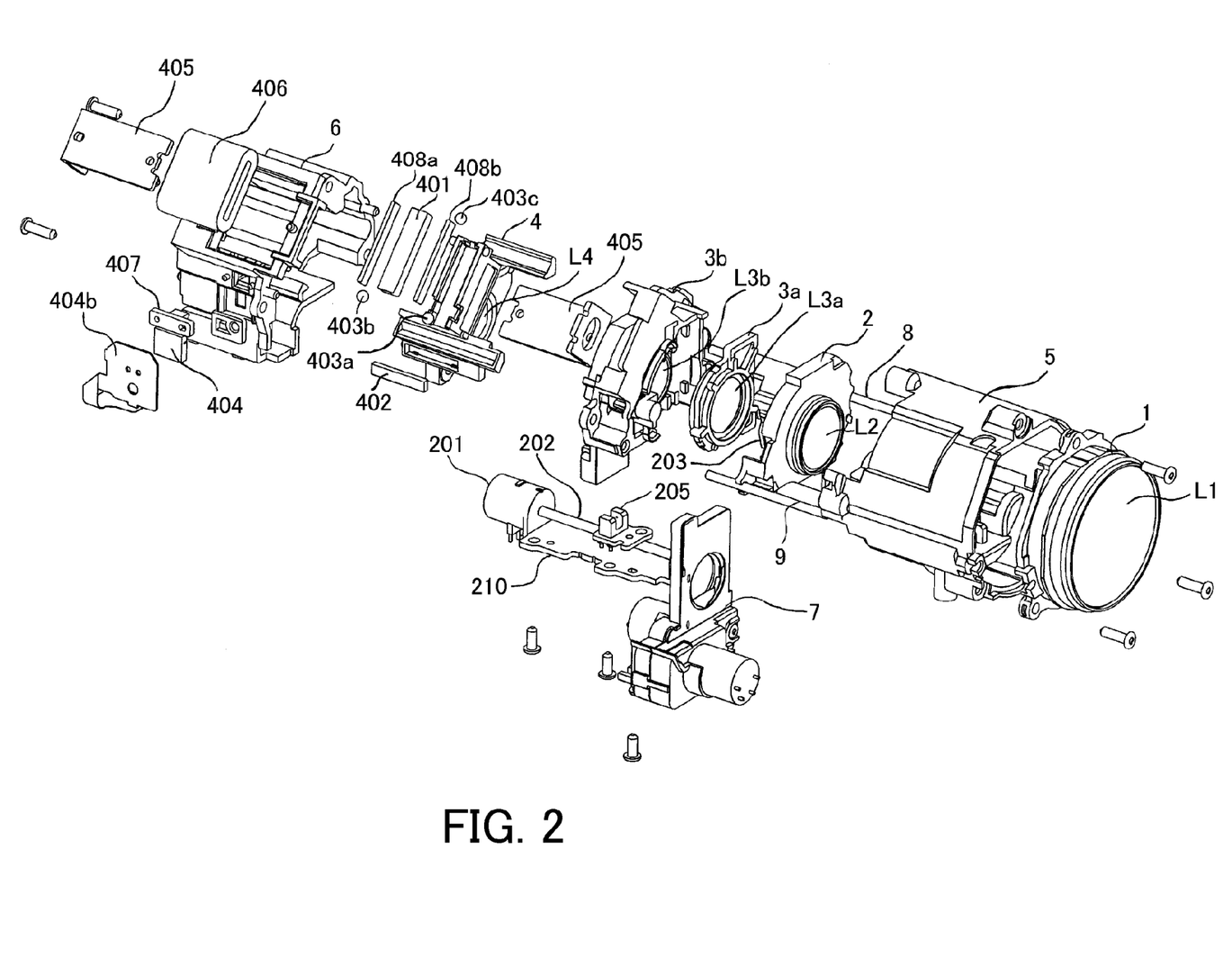
FIG. 2 is an exploded perspective view of a lens barrel mounted on a camera of the embodiment.
Figure 8:
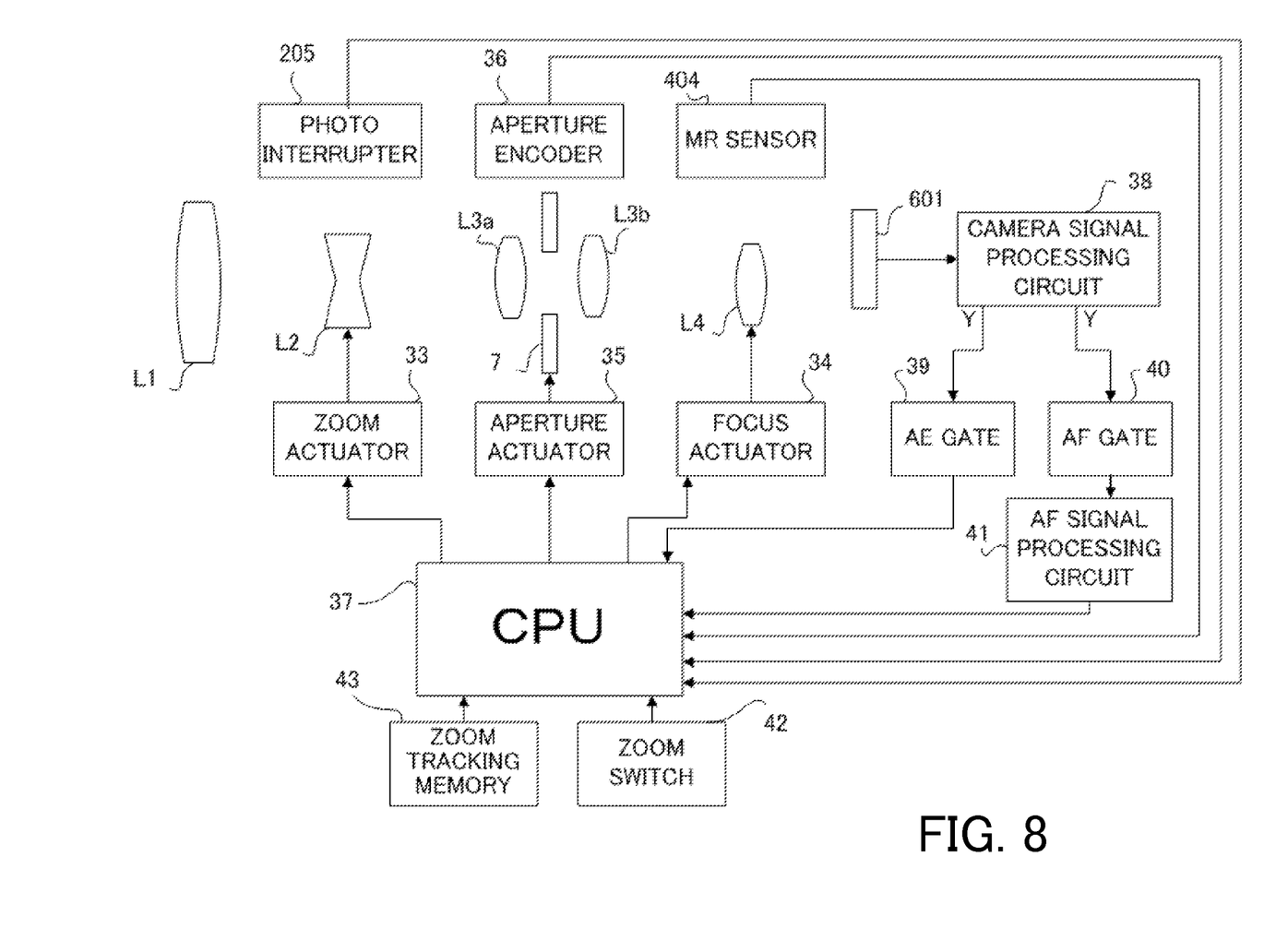
FIG. 8 is a block diagram showing an electric configuration of a camera of the embodiment.

FIG. 8 shows an overall configuration of a camera (mainly, electric configuration). In FIG. 2, reference numerals L1 to L4 denote lens units, which have shapes of convex, concave, convex, and convex, in order from an object side (left side in FIG. 2), respectively, and these constitute an image pickup optical system (variable magnification optical system). The image pickup optical system is housed in a lens barrel described later. Hereinafter, a direction where an optical axis of the image pickup optical system (or each lens unit) extends is referred to as an optical axis direction, and a circumferential direction around the optical axis is referred to as a direction around an optical axis.

A first lens unit L1 is a fixed convex lens unit, and a second lens unit L2 is a concave lens unit which moves in the optical axis direction to perform a variable magnification. Each of a first afocal lens L3a and a second afocal lens L3b is a fixed convex lens, and these constitute a convex third lens unit L3 as a whole. A fourth lens unit (hereinafter, referred to as a focus lens unit) L4 is a convex lens unit which moves in the optical axis direction to perform a focusing operation. Reference numeral 7 denotes an aperture unit and is arranged between the first afocal lens L3a and the second afocal lens L3b.

Reference numeral 33 denotes a zoom actuator which moves the second lens unit L2 in the optical axis direction, and is constituted by a stepping motor. Reference numeral 34 denotes a focus actuator which moves the focus lens unit L4 in the optical axis direction, and is constituted by a linear actuator (a voice coil motor). Reference numeral 35 denotes an aperture actuator which performs an opening and closing operation of a plurality of aperture vanes of the aperture unit 7.

Reference numeral 205 denotes a zoom reset switch which detects that the second lens unit L2 is positioned at a reference position in the optical axis direction, and is constituted by a photo interrupter. Reference numeral 404 denotes a focus position detector which detects a position of the focus lens unit L4 in the optical axis direction, and is constituted by an MR sensor. Reference numeral 36 denotes an aperture encoder which detects an opening and closing position of an aperture unit 7 (aperture vane), and uses a hall element.

Reference numeral 37 denotes a controller which includes a CPU controlling the whole of the camera, or the like. Reference numeral 601 denotes an image pickup element constituted by a CCD sensor, a CMOS sensor, or the like, and performs a photoelectric conversion of an object image formed by the image pickup optical system.

Reference numeral 38 denotes a camera signal processing circuit and performs a signal processing such as an amplification processing, a gamma correction processing, or the like, with respect to an output from the image pickup element 601. An image signal generated through these processes is displayed on a display (not shown) or is recorded in a recording medium (a semiconductor memory, an optical disc, a hard disk, a magnetic tape, or the like) which is not shown.

A luminance signal Y among the image signals is inputted to an AE (auto exposure) gate 39 and an AF (autofocus) gate 40. The AE gate 39 and the AF gate 40 set a range of retrieving a signal optimal for determining exposure and focusing in a full screen.

Reference numeral 41 denotes an AF signal processing circuit, and extracts a high-frequency component from the luminance signal from the AF gate 40 to generate an AF evaluation value signal (contrast evaluation signal) for performing an AF by a method of TV-AF (contrast AF). The AF evaluation value signal is inputted to the controller 37. The controller 37 drives the focus actuator 34 and moves the focus lens unit L4 to a position where the AF evaluation value signal is maximized to obtain an in-focus state.

Reference numeral 42 denotes a zoom switch. Reference numeral 43 denotes a zoom tracking memory. The zoom tracking memory 43 stores information (zoom tracking data) indicating a position relation between the second lens unit L2 and the focus lens unit L4 in accordance with an object distance for maintaining in focus.

When the zoom switch 42 is operated by a user, the controller 37 drives the zoom actuator 33 and the focus actuator 34 so as to maintain the position relation between the second lens unit L2 and the focus lens unit L4 on the zoom tracking data. Thus, variable magnification is performed and an image plane variation in accordance with the variable magnification is corrected to perform a zooming in a focus state.

The controller 37 calculates an average value of outputs of the luminance signals passed through the AE gate 39 as a reference value. Further, it drives the aperture actuator 35 so that an output of the aperture encoder 36 matches the reference value to control the aperture opening size, i.e. light intensity.

Figure 3:
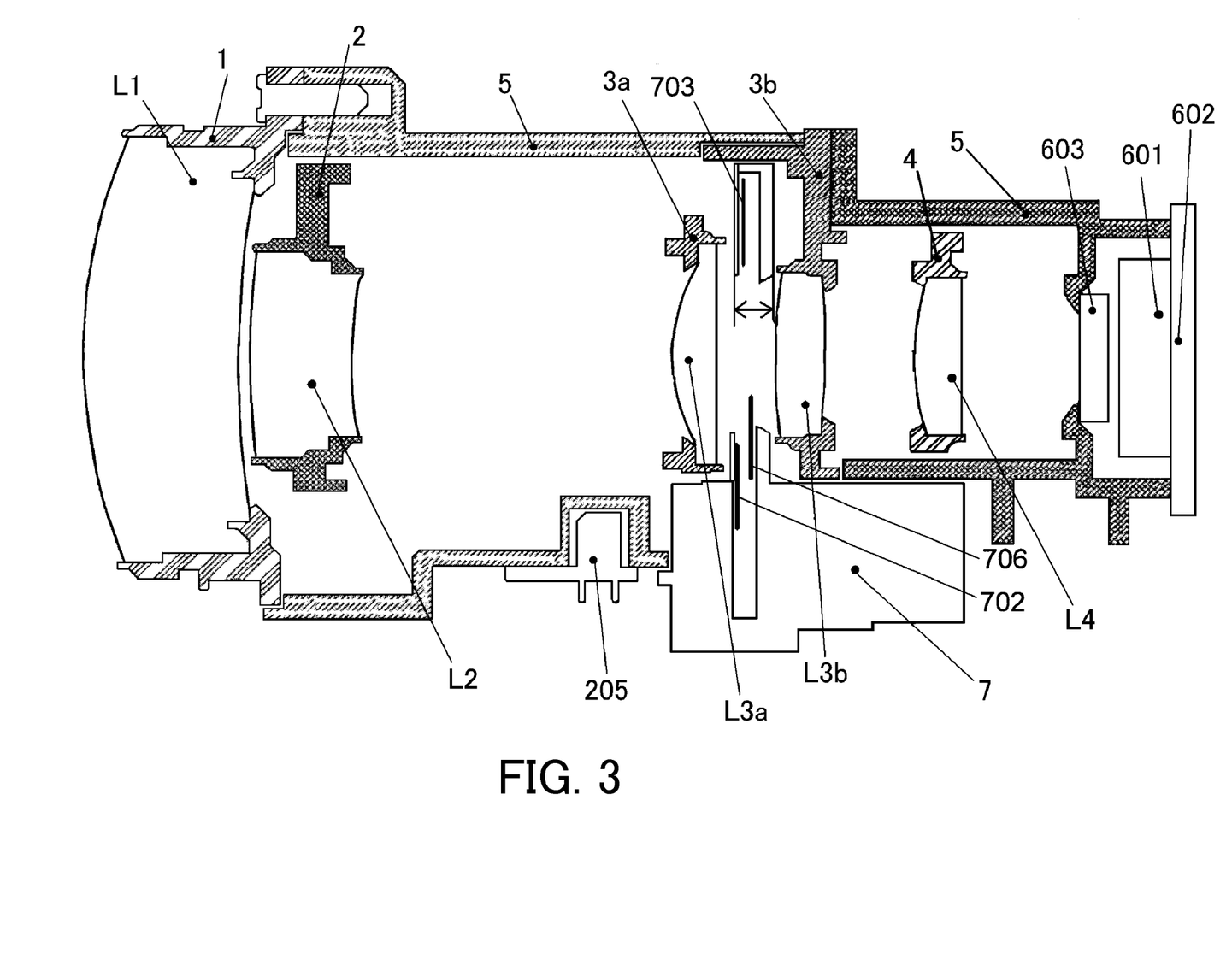
FIG. 3 is a cross-sectional view of a lens barrel of the embodiment.
Figure 5:
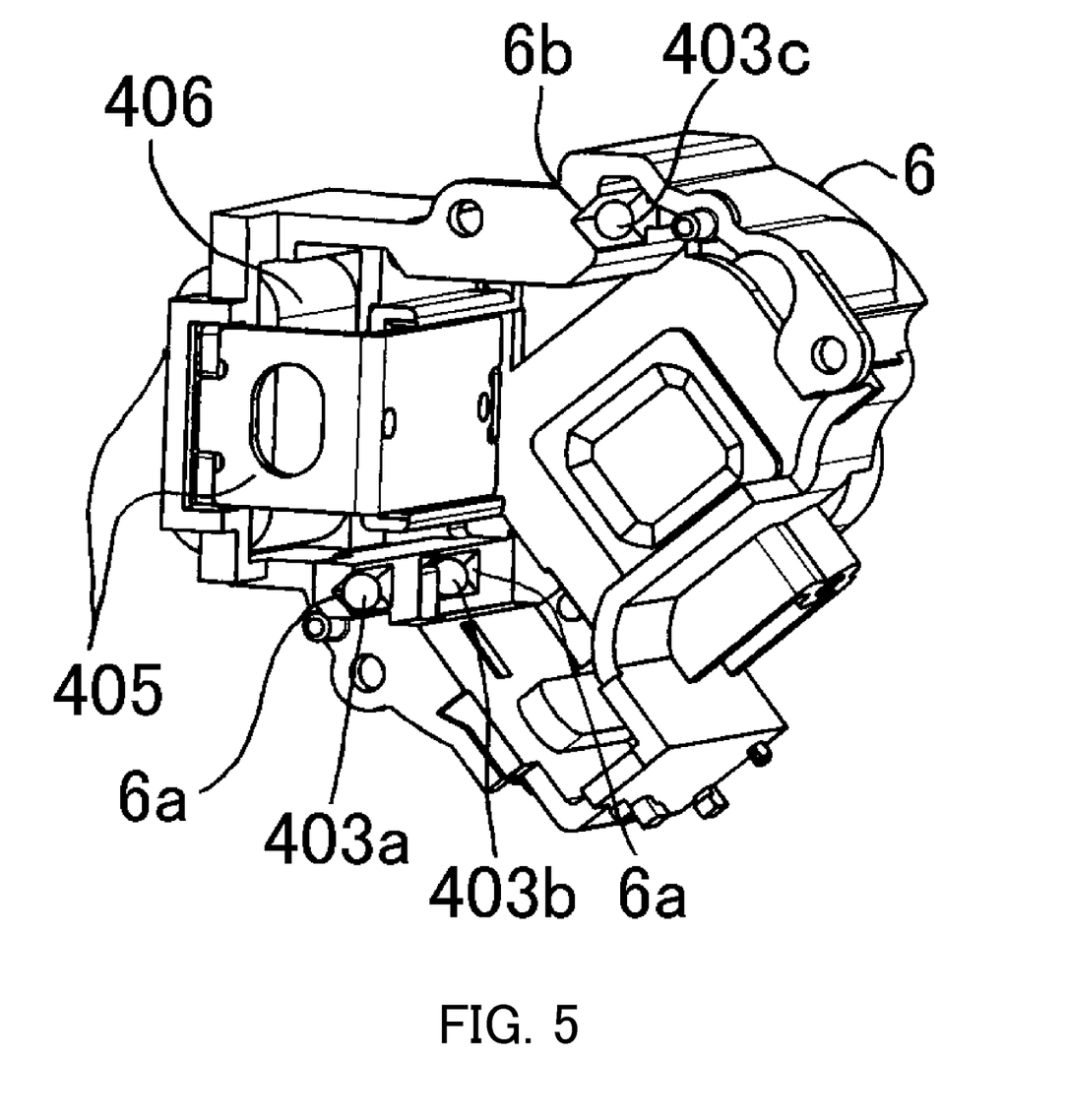
FIG. 5 is a perspective view showing a focus mechanism in a lens barrel of the embodiment.

FIGS. 2, 3, and 5 show mechanical configurations of a lens barrel in a camera of the present embodiment. In these drawings, the same elements as those shown in FIG. 8 are denoted by the same reference numerals as those of FIG. 8, except for a part of them.

In these drawings, reference numeral 1 denotes a front lens barrel which holds the first lens unit L1, and reference numeral 5 denotes a fixed barrel of which the front lens barrel 1 is fixed at a front end part. A rear end of the fixed barrel 5 is connected to a second afocal base member 3b which holds the second afocal lens L3b.

Reference numeral 2 denotes a variator moving frame which holds the second lens unit L2. Reference numeral 3a denotes a first afocal base member which holds the first afocal lens L3a.

Reference numeral 4 denotes a focus moving frame (first member) which holds the focus lens unit L4, and reference numeral 6 denotes a rear barrel (second member) which holds the image pickup element 601 shown in FIG. 8 and movably supports the focus moving frame 4 via a plurality of balls as described later. A front end of the rear barrel 6 is connected to the second afocal base member 3b.

In FIG. 3, reference numeral 602 denotes a substrate for mounting the image pickup element 601 on the rear barrel 6. The substrate 602 is screwed to be fixed on the rear barrel 6 after the image pickup element 601 is fixed on the substrate 602 with an adhesive. An optical filter 603 such as a low-pass filter, an infrared cut filter, or an ultraviolet cut filter is arranged at a front side of the image pickup element 601.

In FIG. 2, reference numeral 8 denotes a first guide bar whose both ends are held by the fixed barrel 5 and the rear barrel 6. Reference numeral 9 denotes a second guide bar whose both ends are held by the fixed barrel 5 and the second afocal base member L3b. The variator moving frame 2 is supported by the first and second guide bars 8 and 9 so as to be movable in an optical axis direction.

The second afocal base member L3b is sandwiched between the rear barrel 6 and the fixed barrel 5 to be connected to these barrels after the positioning with respect to the rear barrel 6 is performed.

In FIG. 3, reference numerals 702 and 703 denote aperture vanes which are provided in the aperture unit 7. Reference numeral 706 denotes an ND filter which is provided in the aperture unit 7 and is retractable with respect to an optical path independently from the aperture vanes 702 and 703. The aperture unit 7 is screwed to be fixed on the second afocal base member L3b.

In FIG. 2, reference numeral 201 denotes a stepping motor (zoom actuator) indicated by reference numeral 33 in FIG. 8. A lead screw 202 is formed on an output axis of the stepping motor 201. The stepping motor 201 is screwed to be fixed on the fixed barrel 5 via a support member 210. A rack 203 mounted on the variator moving frame 2 engages with the lead screw 202. Therefore, when the lead screw 202 is rotated by applying current to the stepping motor 201, the second lens unit L2 is driven in the optical axis direction.

A zoom reset switch 205 detects the switching between a light transmitting state and a light shielding state caused by incomings and outgoings of a light shielding section 206 formed on the variator moving frame 2 between a light transmitting section and a light receiving section. The zoom reset switch 205 is screwed to be fixed on the fixed barrel 5 via the substrate.

Figure 4:
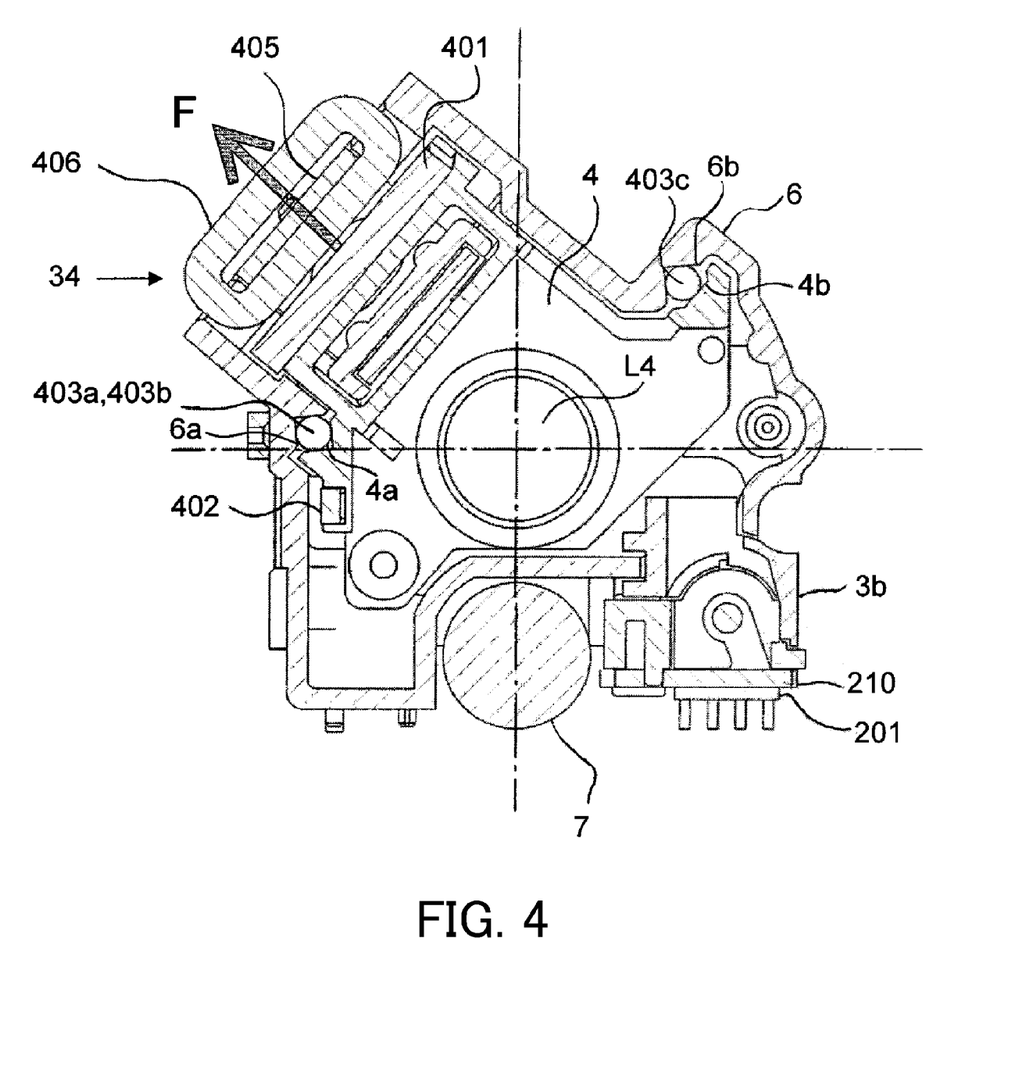
FIG. 4 is a cross-sectional view showing a focus mechanism in a lens barrel of the embodiment when seen from an optical axis direction.

Next, referring to FIGS. 2, 4, and 5, a holding mechanism and a guide mechanism of the focus moving frame 4 will be described.

Reference numerals 401 and 406 denote a drive magnet and a coil, respectively, which constitute a focus actuator (voice coil motor) 34 driving the focus lens unit L4 in an optical axis direction. Reference numeral 405 denotes a yoke for closing magnetic flux, and is constituted by two members in the present embodiment.

The drive magnet 401 is adhesively fixed on the focus moving frame 4. The coil 406 is positioned to be mounted on the yoke 405 and is fixed on the rear barrel 6, similarly to the yoke 405. In other words, the voice coil motor of the present embodiment is a voice coil motor of a moving magnet type in which the drive magnet 401 moves integrally with the focus moving frame 4 in the optical axis direction.

A magnetic attractive force (magnetic force) F acts between the drive magnet 401 fixed on the focus moving frame 4 and the yoke 405 fixed on the rear barrel 6 in a direction orthogonal to the optical axis. Thus, the magnetic attractive force F always acts on the focus moving frame 4 as a biasing force in the direction orthogonal to the optical axis. In other words, the focus actuator 34 (drive magnet 401 and coil 406) is a biasing device which generates a biasing force acting on the focus moving frame 4 in the direction orthogonal to the optical axis, as well as an actuator which moves the focus moving frame 4 in the optical axis direction.

When an electric current is applied to the coil 406, Lorenz force is generated by mutual repulsion of magnetic field lines generated between the magnet 401 and the coil 406, and the focus moving frame 4 (focus lens unit L4) is driven by the Lorenz force in the optical axis direction.

The focus moving frame 4 holds a sensor magnet 402 which is multipolarly magnetized in the optical axis direction. An MR sensor 404 (the focus position detector shown in FIG. 8) which reads the change of magnetic field lines in accordance with the movement of the sensor magnet 402 is screwed to be fixed at a position opposed to the sensor magnet 402 in the rear barrel 6. The signal outputted from the MR sensor 404 is inputted to the controller 37 via a substrate 404b. Thus, a position of the focus moving frame 4, i.e. a moving amount (a position) from a predetermined reference position of the focus lens unit L4 can be detected.

Two balls (first ball) 403a and 403b included in the plurality of balls described above are arranged apart from each other in the optical axis direction at the same phase in a direction around the optical axis and at positions where the distances from the optical axis of the image pickup optical system are the same when seen from the optical axis direction. In other words, the balls 403a and 403b are arranged apart from each other on the same straight line extending in the optical axis direction. Such an arrangement of the balls 403a and 403b can prevent the focus moving frame 4 (focus lens unit L4) from falling with respect to the optical axis of the image pickup optical system.

One ball (second ball) 403c which is included in the plurality of balls described above is arranged at a side opposite to the balls 403a and 403b with respect to a region where the focus actuator 34 (drive magnet 401 and coil 406) is arranged. In other words, the ball 403c is arranged at a phase different from the phase of the balls 403a and 403b. The focus actuator 34 (drive magnet 401 and coil 406) is arranged at a phase which is between the phase where the balls 403a and 403b are arranged and the phase where the ball 403c is arranged in the direction around the optical axis when seen from the optical axis direction. In other words, the focus actuator 34 is arranged at a phase between the phase where a guide section described later is provided and the phase where a rotation preventing section is provided.

V-shaped groove sections 4a and 6a as guide sections extending in the optical axis direction are formed so as to face each other in the focus moving frame 4 and the rear barrel 6, respectively, and the balls 403a and 403b are held between the V-shaped groove sections 4a and 6a so as to be able to perform a rolling motion in the optical axis direction. Furthermore, in the focus moving frame 4 and the rear barrel 6, a plane section 4b and a V-shaped groove section 6b are formed so as to face each other, and the ball 403c is held between the plane section 4b and the V-shaped groove section 6b so as to be able to perform a rolling motion in the optical axis direction. The plane section 4b and the V-shaped groove section 6b constitute a rotation preventing section which extends in the optical axis direction.

The V-shaped groove section 4a and the plane section 4b formed on the focus moving frame 4 press the balls 403a to 403c to the V-shaped groove sections 6a and 6b formed on the rear barrel 6 by the magnetic attractive force (biasing force) F which acts on the focus moving frame 4 in the direction orthogonal to the optical axis.

Thus, the balls 403a and 403b are in contact with two tilt surfaces which constitute the V-shaped groove section 4a and two tilt surfaces which constitute the V-shaped groove section 6a with pressure. In other words, the balls 403a and 403b engage with the V-shaped groove sections 4a and 6a in the direction around the optical axis while the rolling motion is permitted in the optical axis direction.

The structure of the guide section can prevent the focus moving frame 4 from displacing with respect to the rear barrel 6 in a direction different from the optical axis direction. In other words, a positioning of the focus moving frame 4 with respect to the rear barrel 6 is performed in a direction different from the optical axis direction. The direction different from the optical axis direction includes a direction around the optical axis, a horizontal direction, and a perpendicular direction in FIG. 4.

The ball 403c arranged at a phase different from that of the balls 403a and 403b in a direction around the optical axis engages with the V-shaped groove section 6b in the direction around the optical axis, but it does not engage with the plane section 4b. Thus, an error caused by the distance between the V-shaped groove sections 6a and 6b formed on the rear barrel 6 and the difference between the V-shaped groove section 4a and the plane section 4b formed on the focus moving frame 4 is absorbed. The rotation preventing section which is constituted by the V-shaped groove section 4a and the plane section 4b prevents the focus moving frame 4 from rotating around the guide section.

The magnetic attractive force F acts on the focus moving frame 4 so that the V-shaped groove section 4a and the plane section 4b of the focus moving frame 4 press the balls 403a to 403c with respect to the V-shaped groove sections 6a and 6b of the rear barrel 6 in the same direction (a direction parallel to an arrow F) among the directions orthogonal to the optical axis.

Thus, the drive magnet 401 and the coil 406 positioned at a phase between a phase of the balls 403a and 403b and a phase of the ball 403c can bias the V-shaped groove section 4a and the plane section 4b to the V-shaped groove sections 6a and 6b, respectively, in a balanced manner. In other words, a large bias between a force which holds the balls 403a and 403b acting between the V-shaped groove sections 4a and 6a and a force which holds the ball 403c acting between the plane section 4b and the V-shaped section 6b can not be generated. Therefore, a float from the V-shaped groove section or the plane section of the balls 403a and 403b or the ball 403c, or an abrasion of the V-shaped groove section or the plane section at one of the balls 403a and 403b side and the ball 403c side caused by a long use can be prevented.

Figure 6:
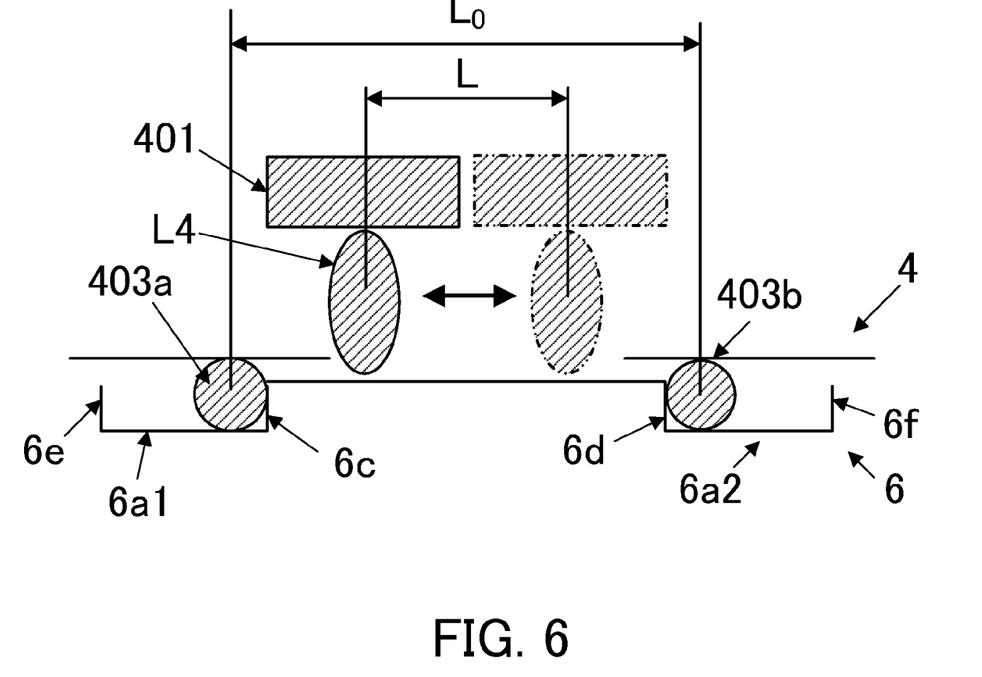
FIG. 6 is a view showing a ball layout in a focus mechanism of the embodiment.

Next, referring to FIG. 6, a layout of the balls 403a and 403b in an optical axis direction will be described. Shapes omitted in FIGS. 2 and 5 are also shown in FIG. 6.

The balls 403a and 403b which are arranged on one straight line extending in the optical axis direction are held so as to be able to perform a rolling motion in the optical axis direction in a predetermined movable range of the inside of an object side V-shaped groove section 6a1 and an image plane (image pickup element) side V-shaped groove section 6a2, respectively, which are provided on the rear barrel 6. An object side stopper 6e and an image plane side stopper 6c are provided at both ends of the object side V-shaped groove section 6a1 in the optical axis direction, and an area between these stoppers 6e and 6c is the movable range described above. Further, an object side stopper 6d and an image plane side stopper 6f are provided at both ends of the image plane side V-shaped groove section 6a2 in the optical axis direction, an area between these stoppers 6d and 6f is the movable range described above. The same stopper is formed at both ends of the V-shaped groove section 6b in the optical axis direction, which holds the ball 403c.

Positions of the image plane side stopper 6c provided on the object side V-shape groove section 6a1 and the object side stopper 6d provided on the image plane side V-shaped section 6a2 in the optical axis direction are set as follows. Namely, they are set so that a center distance $L_0$ of the balls 403a and 403b is larger than a movable range L of the drive magnet 401 when the balls 403a and 403b are the closest to each other in the optical axis direction to be in contact with the stoppers 6c and 6d. In other words, a center of the magnetic attractive force (biasing force) F is always positioned between the balls 403a and 403b in the focus moving frame 4 in the optical axis direction. The center of the magnetic attractive force F can be considered to be a center of the drive magnet 401 and the coil 406.

Thus, the center of the magnetic attractive force F is not positioned at an outside of the balls 403a and 403b in the focus moving frame 4, and accordingly the focus moving frame 4 is prevented from tilting by the attractive force F.

Next, referring to FIG. 7, a reset operation preferably performed at the time of turning on a camera for ensuring a stable rolling motion of the balls 403a to 403c will be described.

For example, when a shock is applied to the camera in a state of power-off, the positions of the balls 403a to 403c are displaced in an optical axis direction, and they may be in contact with the stoppers formed on both sides of the V-shaped groove sections 6a1, 6a2, and 6b (reference numerals 6e or 6c, and 6d or 6f for the V-shaped groove sections 6a1 and 6a2, respectively). When the power is turned on to move the focus moving frame 4 in the optical axis direction in this state, the ball slides without rolling in the V-shaped groove section and a sliding friction is generated to increase a drive load of the focus moving frame 4.

Figure 7:
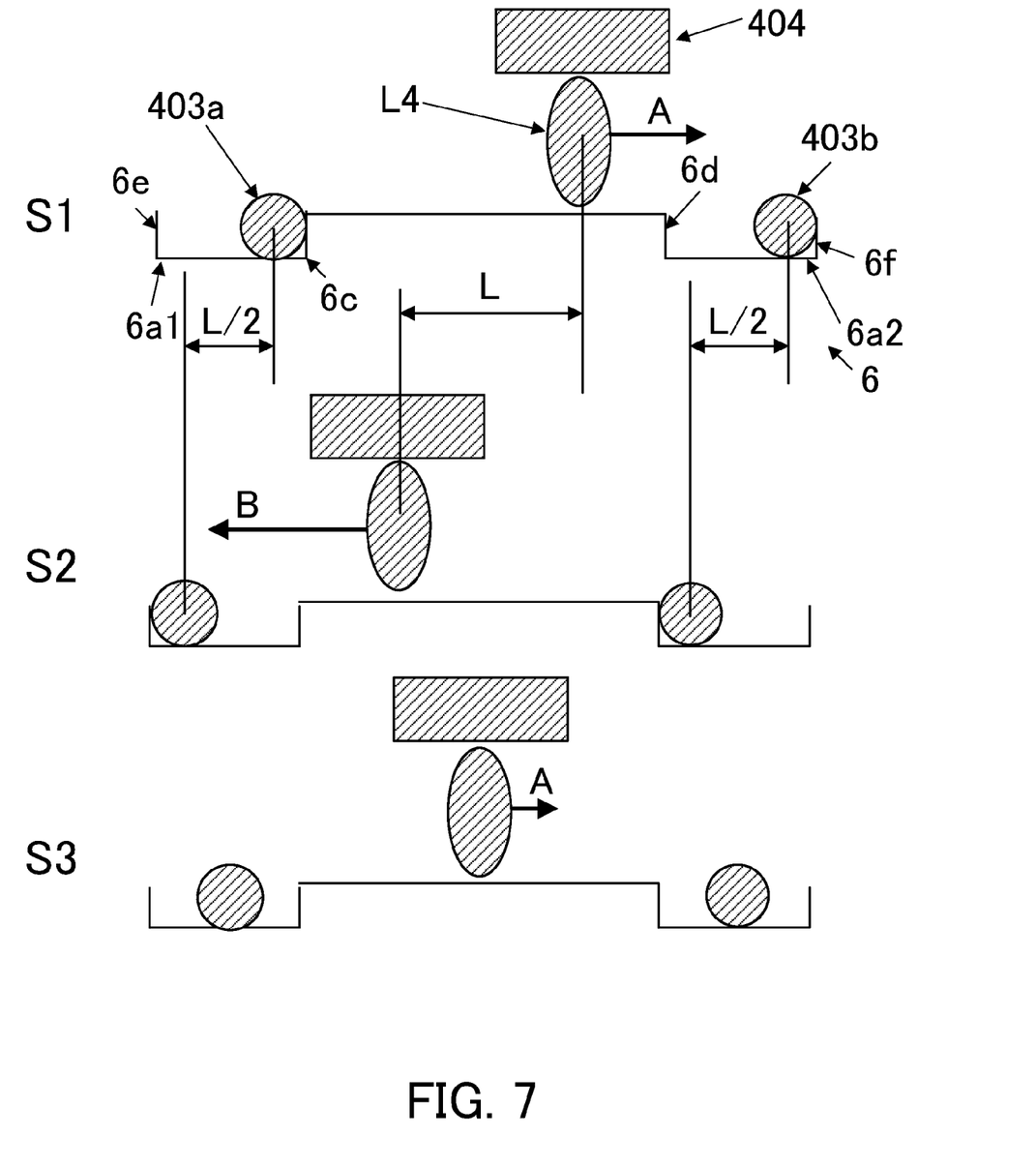
FIG. 7 is a view describing a reset operation in a focus mechanism of the embodiment.

Therefore, as shown in S1 of FIG. 7, when turning the power on, first, the focus moving frame 4 moves up to an end of an A direction (for example, an image plane direction) of its movable range.

Next, as shown in S2, the focus moving frame 4 moves up to the end of a B direction (for example, an object direction) of the movable range (S2). Thus, the balls 403a and 403b are in contact with the stopper in the B direction wherever they are positioned in the V-shaped groove section before S1. Subsequently, the focus moving frame 4 moves to an arbitrary position (S3). Thus, the balls 403a and 403b are reset to be at a rolling motion position which corresponds to a position of the focus moving frame 4.

In the embodiment, the interval between the stoppers of both ends (a movable range of the ball) is preferably set to equal to or more than [1/(2 L)+ball diameter], where L is a moving stroke (movable range) of the focus moving frame 4.

This is because the moving amount of the ball interposed between the fixed rear barrel 6 and the movable focus moving frame 4 in an optical axis direction is ½ of the moving stroke L of the focus moving frame 4 by the rolling motion of the ball.

Performing the reset operation as described above can ensure the rolling motion of the ball in a whole range of the moving stroke L of the focus moving frame 4 wherever the ball is positioned in the movable range before the reset operation.

According to the present embodiment, a minor backlash or a rotation in a direction around an optical axis of a first member (a lens) can be practically disappeared by a ball guide mechanism which has a low generation load caused by the movement of the first member (the lens).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

For example, the shapes of the V-shaped groove sections 4a, 6a, and 6b, and the plane section 4b described in the above embodiment is simply an example, but another shape may be applicable if it can perform the similar function.

In the above embodiment, the case where a voice coil motor of a moving magnet type is used as an actuator has been described. However, a voice coil motor of a moving coil type can also be used if the coil is fixed on the focus moving frame and the drive magnet is fixed on the rear barrel. Further, instead of the voice coil motor, a motor such as an oscillation type linear actuator or a stepping motor may also be used as an actuator.

In the above embodiment, the case where a guide mechanism and a rotation preventing section where a ball is used between a focus moving frame and a rear barrel has been described, but the similar guide mechanism and rotation preventing section may also be provided between a variator moving frame and a fixed barrel.

In the above embodiment, the case where two balls 403a and 403b are arranged on the same straight line extending in an optical axis direction has been described, but these balls have only to be away from each other in the optical axis direction, and they do not have to be arranged on the same straight line.

Furthermore, in the above embodiment, an image pickup apparatus in which a lens barrel is integrally provided on a camera body has been described, but the present invention can also be applicable to an interchangeable lens apparatus detachable from the camera body or an optical apparatus such as an observation apparatus, for example binoculars.

This application claims the benefit of Japanese Patent Application No. 2008-212312, filed on Aug. 21, 2008, which is hereby incorporated by reference herein in its entirety.

What is claimed is:

1. An optical apparatus comprising:
a first member which holds a lens;
a second member which supports the first member so as to be movable in an optical axis direction via a plurality of balls; and
a biasing device which has a biasing force acting on the first member for pressing the plurality of balls with respect to the second member,
wherein the plurality of balls include two first balls which are arranged at positions away from each other in the optical axis direction and a second ball arranged at a phase different from that of the first balls in a direction around the optical axis,
wherein the first and second members includes a guide section which is configured to engage with the first balls so as to permit a rolling motion of the first balls in the optical axis direction and prevent a displacement of the first member with respect to the second member in a direction different from the optical axis direction and a rotation preventing section which is configured to permit a rolling motion of the second ball in the optical axis direction and prevent a rotation of the first member with respect to the second member around the guide section, and
wherein the interval between both sides in the optical axis direction of the guide section is set to more than a movable range of the ball when the ball moves in the optical axis direction of the lens.

2. An optical apparatus according to claim 1,
wherein the biasing device is arranged at a phase between a phase where the guide section is provided and a phase where the rotation preventing section is provided in the direction around the optical axis when seen from the optical axis direction, and
wherein the biasing force is configured to act on the guide section and the rotation preventing section in the same direction.

3. An optical apparatus according to claim 1,
wherein the biasing device is configured to have the biasing force acting on the first member so that a center of the biasing force is positioned between the two first balls in the first member in the optical axis direction.

4. An optical apparatus according to claim 1,
wherein the biasing device is configured to generate a magnetic force as the biasing force.

5. An optical apparatus according to claim 4, further comprising an actuator which is configured to move the first member in the optical axis direction,
wherein the actuator is configured to generate the magnetic force.

6. An optical apparatus comprising:
a first member that holds a lens;
a second member that supports the first member so as to be movable in an optical axis direction via a plurality of balls; and
a biasing device that has a biasing force acting on the first member for pressing the plurality of balls with respect to the second member,
wherein the plurality of balls include two first balls that are arranged at positions away from each other in the optical axis direction and a second ball arranged at a phase different from that of the first balls in a direction around the optical axis,
wherein the first and second members include a guide section that is configured to engage with the first balls so as to permit a rolling motion of the first balls in the optical axis direction and prevent a displacement of the first member with respect to the second member in a direction different from the optical axis direction and a rotation preventing section that is configured to permit a rolling motion of the second ball in the optical axis direction and prevent a rotation of the first member with respect to the second member around the guide section, and
wherein the interval between both sides in the optical axis direction of the guide section is set to more than $[(½)\times L+D]$, where L is a moving stroke of the first member and D is a ball diameter.

7. An optical apparatus comprising:
a first member that holds a lens;
a second member that supports the first member so as to be movable in an optical axis direction via a plurality of balls; and
a biasing device that has a biasing force acting on the first member for pressing the plurality of balls with respect to the second member,
wherein the plurality of balls are arranged at positions away from each other in the optical axis direction,
wherein the first and second members include a guide section that is configured to engage with the balls so as to permit a rolling motion of the balls in the optical axis direction and prevent a displacement of the first member with respect to the second member in a direction different from the optical axis direction and a rotation preventing section that is configured to prevent a rotation of the first member with respect to the second member around the guide section, and
wherein the interval between both sides in the optical axis direction of the guide section is set to more than a movable range of the ball when the ball moves in the optical axis direction of the lens.

8. An optical apparatus comprising:
a first member that holds a lens;
a second member that supports the first member so as to be movable in an optical axis direction via a plurality of balls; and
a biasing device that has a biasing force acting on the first member for pressing the plurality of balls with respect to the second member,
wherein the plurality of balls are arranged at positions away from each other in the optical axis direction,
wherein the first and second members includes a guide section that is configured to engage with the balls so as to permit a rolling motion of the balls in the optical axis direction and prevent a displacement of the first member with respect to the second member in a direction different from the optical axis direction and a rotation preventing section that is configured to prevent a rotation of the first member with respect to the second member around the guide section, and
wherein the interval between both sides in the optical axis direction of the guide section is set to more than $[(½)\times L+D]$, where L is a moving stroke of the first member and D is a ball diameter.

9. An optical apparatus comprising:
a first member that holds a lens;
a second member that supports the first member so as to be movable in an optical axis direction via a plurality of balls; and
a biasing device that has a biasing force acting on the first member for pressing the plurality of balls with respect to the second member, wherein the plurality of balls include two first balls that are arranged at positions away from each other in the optical axis direction and a second ball arranged at a phase different from that of the first balls in a direction around the optical axis, wherein the first and second members include a guide section that is configured to engage with the first balls so as to permit a rolling motion of the first balls in the optical axis direction and prevent a displacement of the first member with respect to the second member in a direction different from the optical axis direction and a rotation preventing section that is configured to permit a rolling motion of the second ball in the optical axis direction and prevent a rotation of the first member with respect to the second member around the guide section, wherein the interval between both sides in the optical axis direction of the guide section is set to more than a movable range of the ball when the ball moves in the optical axis direction of the lens, and wherein a reset operation is performed that the first member moves up to one side of the movable range and after the first member moves up to another side of the movable range.

10. An optical apparatus comprising:

a first member that holds a lens;

a second member that supports the first member so as to be movable in an optical axis direction via a plurality of balls; and a biasing device that has a biasing force acting on the first member for pressing the plurality of balls with respect to the second member, wherein the plurality of balls include two first balls that are arranged at positions away from each other in the optical axis direction and a second ball arranged at a phase different from that of the first balls in a direction around the optical axis, and wherein the first and second members include a guide section that is configured to engage with the first balls so as to permit a rolling motion of the first balls in the optical axis direction and prevent a displacement of the first member with respect to the second member in a direction different from the optical axis direction and a rotation preventing section that is configured to permit a rolling motion of the second ball in the optical axis direction and prevent a rotation of the first member with respect to the second member around the guide section, wherein the interval between both sides in the optical axis direction of the guide section is set to more than $[(\frac{1}{2}) \times L + D]$, where L is a moving stroke of the first member and D is a ball diameter, and wherein a reset operation is performed that the first member moves up to one side of a movable range and after the first member moves up to another side of the movable range.

11. An optical apparatus comprising:

a first member that holds a lens;

a second member that supports the first member so as to be movable in an optical axis direction via a plurality of balls; and a biasing device that has a biasing force acting on the first member for pressing the plurality of balls with respect to the second member, wherein the plurality of balls are arranged at positions away from each other in the optical axis direction, wherein the first and second members include a guide section that is configured to engage with the balls so as to permit a rolling motion of the balls in the optical axis direction and prevent a displacement of the first member with respect to the second member in a direction different from the optical axis direction and a rotation preventing section that is configured to prevent a rotation of the first member with respect to the second member around the guide section, wherein the interval between both sides in the optical axis direction of the guide section is set to more than a movable range of the ball when the ball moves in the optical axis direction of the lens, and wherein a reset operation is performed that the first member moves up to one side of a movable range and after the first member moves up to another side of the movable range.

12. An optical apparatus comprising:

a first member that holds a lens;

a second member that supports the first member so as to be movable in an optical axis direction via a plurality of balls; and a biasing device that has a biasing force acting on the first member for pressing the plurality of balls with respect to the second member, wherein the plurality of balls are arranged at positions away from each other in the optical axis direction, and wherein the first and second members include a guide section that is configured to engage with the balls so as to permit a rolling motion of the balls in the optical axis direction and prevent a displacement of the first member with respect to the second member in a direction different from the optical axis direction and a rotation preventing section that is configured to prevent a rotation of the first member with respect to the second member around the guide section, wherein the interval between both sides in the optical axis direction of the guide section is set to more than $[(\frac{1}{2}) \times L + D]$, where L is a moving stroke of the first member and D is a ball diameter, and wherein a reset operation is performed that the first member moves up to one side of a movable range and after the first member moves up to another side of the movable range.

13. An optical apparatus comprising:

a first member that holds a lens;

a second member that supports the first member so as to be movable in an optical axis direction via a plurality of balls; and a biasing device that has a biasing force acting on the first member for pressing the plurality of balls with respect to the second member, wherein the plurality of balls include two first balls that are arranged at positions away from each other in the optical axis direction and a second ball arranged at a phase different from that of the first balls in a direction around the optical axis, wherein the first and second members include a guide section that is configured to engage with the first balls so as to permit a rolling motion of the first balls in the optical axis direction and prevent a displacement of the first member with respect to the second member in a direction different from the optical axis direction and a rotation preventing section that is configured to permit a rolling motion of the second ball in the optical axis direction and prevent a rotation of the first member with respect to the second member around the guide section, wherein the interval between both sides in the optical axis direction of the guide section is set to more than a movable range of the ball when the ball moves in the optical axis direction of the lens, and wherein a reset operation is performed that the first member moves up to one side of the movable range and after the first member moves up to another side of the movable range to prevent the ball from being in contact with both sides of the first member when the ball moves in the optical axis direction of the lens.

14. An optical apparatus comprising:

a first member that holds a lens;

a second member that supports the first member so as to be movable in an optical axis direction via a plurality of balls; and a biasing device that has a biasing force acting on the first member for pressing the plurality of balls with respect to the second member, wherein the plurality of balls include two first balls which are arranged at positions away from each other in the optical axis direction and a second ball arranged at a phase different from that of the first balls in a direction around the optical axis, wherein the first and second members include a guide section that is configured to engage with the first balls so as to permit a rolling motion of the first balls in the optical axis direction and prevent a displacement of the first member with respect to the second member in a direction different from the optical axis direction and a rotation preventing section that is configured to permit a rolling motion of the second ball in the optical axis direction and prevent a rotation of the first member with respect to the second member around the guide section, wherein the interval between both sides in the optical axis direction of the guide section is set to more than $[(\frac{1}{2}) \times L + D]$, where L is a moving stroke of the first member and D is a ball diameter, and wherein a reset operation is performed that the first member moves up to one side of a movable range and after the first member moves up to another side of the movable range to prevent the ball from being in contact with both sides of the first member when the ball moves in the optical axis direction of the lens.

15. An optical apparatus comprising:

a first member that holds a lens;

a second member that supports the first member so as to be movable in an optical axis direction via a plurality of balls; and a biasing device that has a biasing force acting on the first member for pressing the plurality of balls with respect to the second member, wherein the plurality of balls are arranged at positions away from each other in the optical axis direction, wherein the first and second members include a guide section that is configured to engage with the balls so as to permit a rolling motion of the balls in the optical axis direction and prevent a displacement of the first member with respect to the second member in a direction different from the optical axis direction and a rotation preventing section that is configured to prevent a rotation of the first member with respect to the second member around the guide section, wherein the interval between both sides in the optical axis direction of the guide section is set to more than a movable range of the ball when the ball moves in the optical axis direction of the lens, and wherein a reset operation is performed that the first member moves up to one side of a movable range and after the first member moves up to another side of the movable range to prevent the ball from being in contact with both sides of the first member when the ball moves in the optical axis direction of the lens.

16. An optical apparatus comprising:

a first member that holds a lens;

a second member that supports the first member so as to be movable in an optical axis direction via a plurality of balls; and a biasing device that has a biasing force acting on the first member for pressing the plurality of balls with respect to the second member, wherein the plurality of balls are arranged at positions away from each other in the optical axis direction, wherein the first and second members include a guide section that is configured to engage with the balls so as to permit a rolling motion of the balls in the optical axis direction and prevent a displacement of the first member with respect to the second member in a direction different from the optical axis direction and a rotation preventing section that is configured to prevent a rotation of the first member with respect to the second member around the guide section, wherein the interval between both sides in the optical axis direction of the guide section is set to more than $[(\frac{1}{2}) \times L + D]$, where L is a moving stroke of the first member and D is a ball diameter, and wherein a reset operation is performed that the first member moves up to one side of a movable range and after the first member moves up to another side of the movable range to prevent the ball from being in contact with both sides of the first member when the ball moves in the optical axis direction of the lens.

* * * * *